United States Patent

Okada et al.

[11] Patent Number: 5,900,904
[45] Date of Patent: May 4, 1999

[54] PICTURE REPRODUCTION POSITION DETECTING APPARATUS FOR USE WITH VIDEO ON DEMAND SYSTEM

[75] Inventors: Akihiro Okada; Masayuki Ozawa; Mamoru Udagawa; Shuuichi Hiroshima, all of Kawasaki, Japan

[73] Assignee: Fujitsu Limited, Kawasaki, Japan

[21] Appl. No.: 08/633,301

[22] Filed: Apr. 17, 1996

[30] Foreign Application Priority Data

Jun. 9, 1995 [JP] Japan .................................... 7-143138

[51] Int. Cl.[6] ........................................................ H04N 7/14
[52] U.S. Cl. ............................................. 348/7; 395/200.49
[58] Field of Search ..................................... 348/7, 10, 12, 348/13; 455/5.1, 6.1, 4.1; 386/6, 33, 68, 69, 70, 81, 82, 111, 112; 345/328, 329; 395/200.48, 200.49; H04N 7/10

[56] References Cited

U.S. PATENT DOCUMENTS

| 5,506,615 | 4/1996 | Awaji ............................................. 348/7 |
| 5,521,630 | 5/1996 | Chen et al. ................................... 348/7 |
| 5,586,264 | 12/1996 | Belknap et al. .................... 395/200.08 |
| 5,606,359 | 2/1997 | Youden et al. .............................. 348/7 |
| 5,757,433 | 5/1998 | Takano .................................... 348/384 |
| 5,771,335 | 6/1998 | Lee ......................................... 386/111 |

FOREIGN PATENT DOCUMENTS 63-311891  12/1988  Japan .

*Primary Examiner*—Victor R. Kostak
*Attorney, Agent, or Firm*—Staas & Halsey

[57] ABSTRACT

A system provider has a data storing unit for storing at least one digital picture data block referred to as a minimum playback picture block (GOP: Group of Pictures) in each fixed-length area (for example, picture data for one second is composed of eight GOPs) and a detecting unit for detecting an address in the data storing unit for the picture data to be provided as playback picture data corresponding to a playback request received from a user.

14 Claims, 20 Drawing Sheets

I FRAME : INTRA REFERENCE COMPRESSED FRAME
B FRAME : BIDIRECTIONAL PREDICTIVE COMPRESSED FRAME
P FRAME : PREDICTIVE COMPRESSED FRAME
GOP : GROUP OF PICTURES

PICTURE/SOUND DATA FOR FORWARD PLAYBACK OPERATION    256 BLOCKS

PICTURE/SOUND DATA FOR FAST-FORWARD PLAYBACK OPERATION    32 BLOCKS

PICTURE/SOUND DATA FOR REWIND PLAYBACK OPERATION    32 BLOCKS

FIG. 11

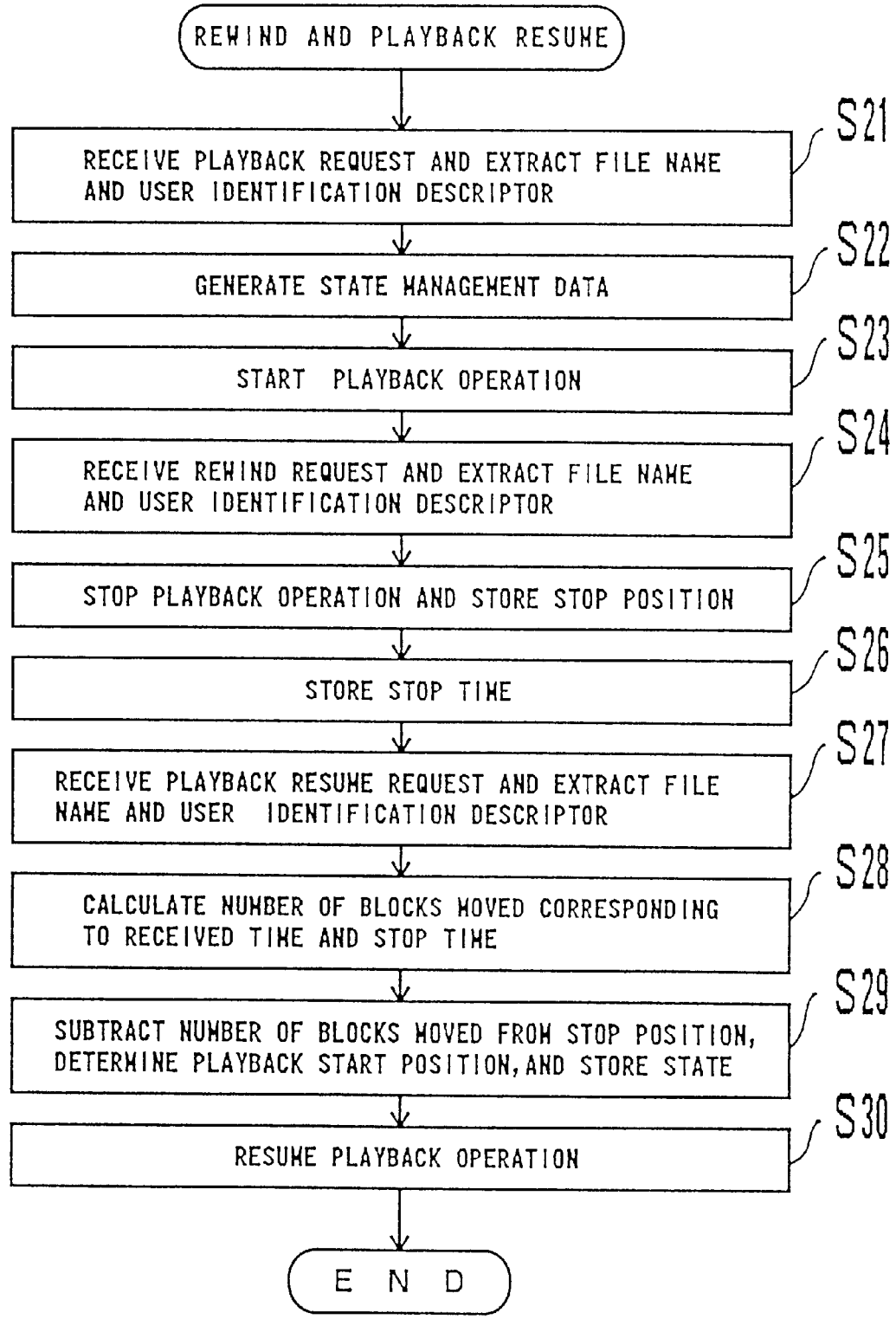
F I G. 1 4

PICTURE REPRODUCTION POSITION DETECTING APPARATUS FOR USE WITH VIDEO ON DEMAND SYSTEM

BACKGROUND OF THE INVENTION

1. Field of the Invention

The present invention relates to a picture data reproducing system for use with a video on-demand system that provides the user with picture data and sound data through a network corresponding to a request received from a user, and in particular to a picture reproduction position detecting system for detecting the start position of a reproduced picture.

2. Description of the Related Art

In a video-on-demand system for providing a user with picture data and sound data through a network corresponding to a request received from the user, it is necessary to accomplish an operability and a response that are the same as those with which the user reproduces picture data using a video cassette recorder, without being conscious of a network and a center that provide the user with the data.

FIG. 1 is a block diagram showing a structure of a conventional video-on-demand system. In FIG. 1, the system is composed of a video-on-demand center 1 that provides a user with picture/sound data, a network 2, a television set 3 with which the user side reproduces the picture/sound data, a set top unit (STU) 5 that sends a request of the user from a remote controller 4 through the television set 3 to the center 1 corresponding to a predetermined protocol, a personal computer 6 used by another user as a substitute for the television set 3, and so forth.

When a video server in the video-on-demand center 1 sends picture/sound data requested by the user, the video server should quickly detect the stored position and the playback start position of the requested picture data. As requests received from the user, there are a playback request, a pause request, a rewind request, a fast-forward request, and so forth. The video server should quickly and accurately detect the picture/sound sending position or the playback resume position corresponding to such requests and send the requested data.

FIG. 2 is a schematic diagram showing an example of a format of digital picture data and sound data stored in the video-on-demand center 1. Conventionally, picture data is converted into digital data, compressed, and then stored. Digital picture data is compressed and stored on a disk of the server. On the disk of the server, the digital picture data is stored at a position corresponding to sound data. In addition, time data necessary for synchronizing the picture data with the sound data, playback time data, and so forth are added to the digital picture data.

In FIG. 2, "data type" in the header information represents an identification of picture data or sound data and playback speed. "Compression code type" represents an encoding system to be used. (In the embodiment of the present invention, the MPEG (Moving Picture Expert Group), as an encoding system that allows video data to be effectively stored in a digital data storing medium, is used.) "Playback start relative time" represents a relative time period after picture data is played back until data including the header data is played back. The header data also includes the "amount of data".

In conventional video-on-demand systems, there are two systems for detecting a picture data playback position corresponding to a request received from the user. In the first system, the playback start relative time in the header data shown in FIG. 2 is read. The playback start position is then detected corresponding to the relative time.

In the second system, all the header data is read beforehand. A table having the relation of the playback start relative time of the header data and the picture data storing positions on the disk is created. In the second system, the table is searched for the playback start position.

However, in the first method, whenever a request is received from the user, the disk is accessed for each header data so as to read the playback start relative time included in each header. Since digital picture data is compressed and stored, the playback time varies for each digital picture data. In this system, the amount of data to be processed becomes huge. For example, when many users send their requests to the video-on-demand center, it cannot handle them all at the same time.

In the second system, since the table that has been created beforehand is searched for the playback start position of the requested picture data, the performance is higher than that of the first system. However, in the second system, after the table is searched with a pointer of time, the disk should be accessed. Thus, it is also difficult to handle requests received from many users at the same time.

SUMMARY OF THE INVENTION

An object of the present invention is to reduce the time necessary for detecting the playback start position corresponding to a request received from a user and to handle requests received from many users at the same time.

According to a feature of the present invention, for example, eight minimum playback picture blocks have been encoded per second. One minimum playback picture block is stored in each of a plurality of fixed-length storage areas of a disk. Thus, the time period necessary for detecting the playback resume position, preceded by the rewind operation corresponding to, for example, a rewind request received from the user, can be reduced. In addition, since the processing time is reduced, even when requests for picture data are received from many users at the same time, these requests can be handled. Thus, the present invention can remarkably contribute to accomplishing a video-on-demand system.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 11 is a schematic diagram for explaining a method for storing digital picture/sound data, including digital data for a fast-forward playback operation and digital data for a rewind playback operation on a disc;

FIG. 14 is a flow chart showing a process in which a playback resume operation is performed after a rewind operation;

DESCRIPTION OF THE PREFERRED EMBODIMENT

Figure 3:
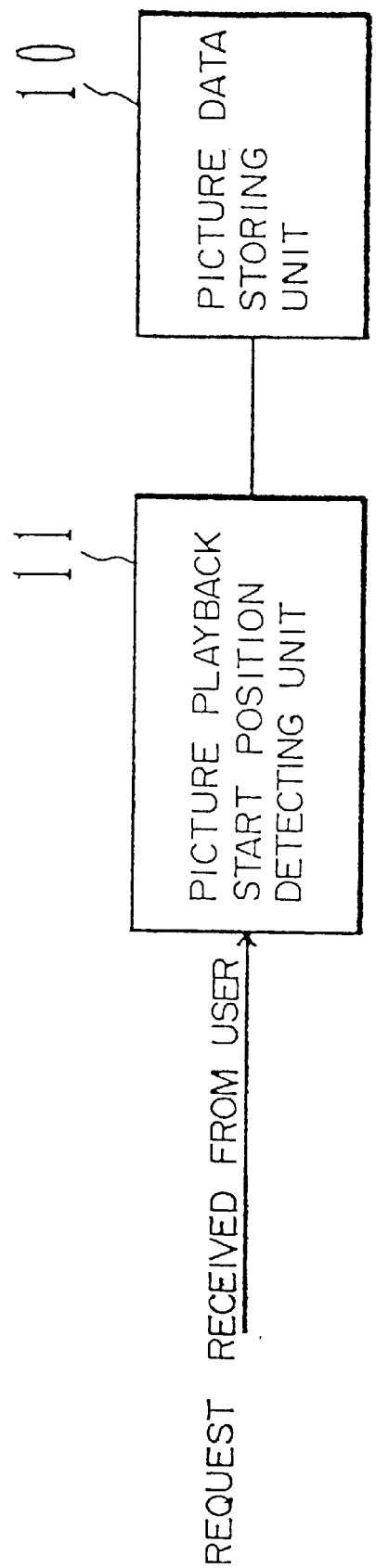
FIG. 3 is a block diagram showing a structure of the present invention.

FIG. 3 is a block diagram showing a structure of a picture playback position detecting apparatus for use with a video-on-demand system that provides a user with picture/sound data through a network corresponding to a request received from the user. The picture playback position detecting apparatus provides picture data for the user corresponding to a request received from the user after detecting the playback start position of the picture data stored on, for example, a disk in the center of a provider.

In FIG. 3, a picture data storing unit 10 stores digital picture data composed of minimum digital picture blocks referred to as a GOP (Group Of Pictures) in such a manner that at least one GOP is stored in each of the fixed-length storage areas. The minimum digital playback picture block is a block in which picture data is encoded and compressed. For example, in the MPEG system, the minimum digital playback picture block is composed of frame data in the range from one I frame to the next I frame. Picture data is encoded in such a manner that a predetermined number of blocks (for example, eight blocks) are present in a predetermined time period (for example, one second).

A picture playback start position detecting unit 11 detects the storing position in the picture data storing unit 10 for picture data to be provided as playback picture data corresponding to a request received from a user. While picture data is being played back, when the user requests a fast-forward operation and then a playback resume operation, the picture playback start position detecting unit 11 detects the playback start position.

According to the present invention, the storage area of the picture data storing unit 10 shown in FIG. 3 is divided into successive fixed-length areas. For example, one data block referred to as minimum digital picture data block (GOP) is stored in each fixed-length area.

The GOP is picture data in which picture data is encoded and compressed in such a manner that a predetermined number of GOPs (for example, eight GOPs) are present in a predetermined time period (for example, one second). Although the playback time necessary for each GOP is not constant, a predetermined number of (for example eight) GOPs can be correlated with a playback time period. That is, the picture data can be associated with each second for eight fixed-length areas, in other words, in 8-block units.

In the case of a fast-forward playback operation in which the user requests a fast-forward operation during a playback operation, and then requests a picture playback operation, the difference between the time at which the user requested the stop of the playback operation (namely, the start of the fast-forward operation) and the time at which the user requested the start of the playback operation again, is obtained. The number of blocks of picture data moved per second in the picture data storing unit 10 is multiplied by the difference time. Thus, the start position of the picture data to be played back after the fast-forward operation is detected. Corresponding to the detected result, the picture data is supplied to the user. Thus, as with the operation of a conventional video cassette recorder, the user can receive the picture/sound data requested.

According to the present invention, only one type of playback picture/sound data may be stored on a disk in the forward playback order. When the moving speed of picture data on the disk in the playback operation and in the fast-forward operation is varied, the picture playback start position can be detected. However, in the case that playback picture/sound data for the fast-forward operation and playback picture/sound data for the rewind operation are stored apart from the forward playback picture/sound data, when such dedicated picture data is provided in, for example, the fast-forward playback operation, the user is smoothly provided with the picture data.

Figure 1:
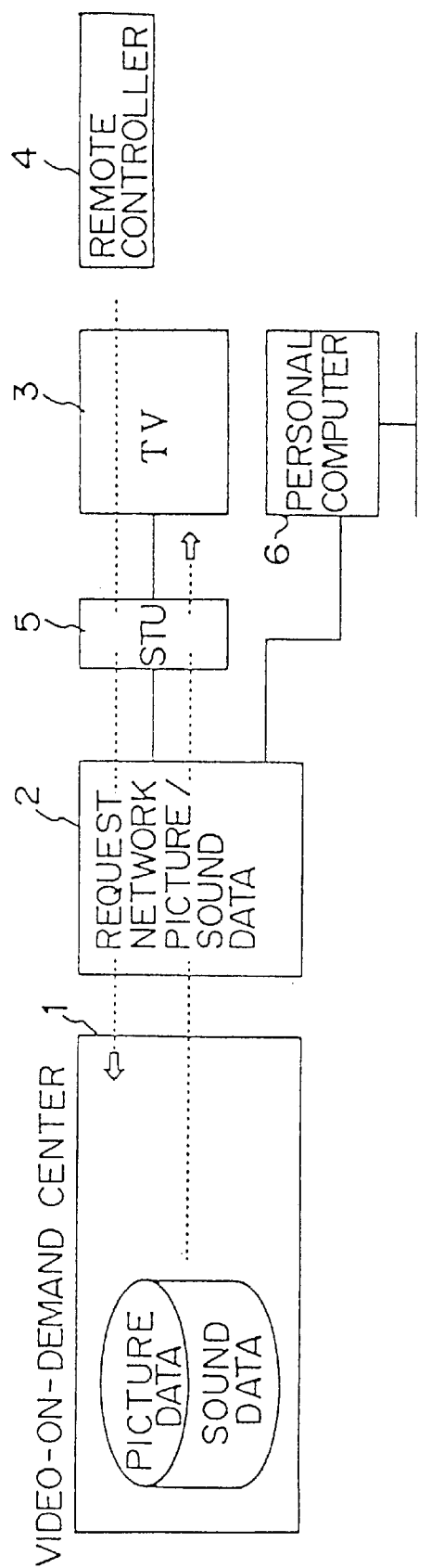
FIG. 1 is a block diagram showing a structure of a conventional video-on-demand system.
Figure 4:
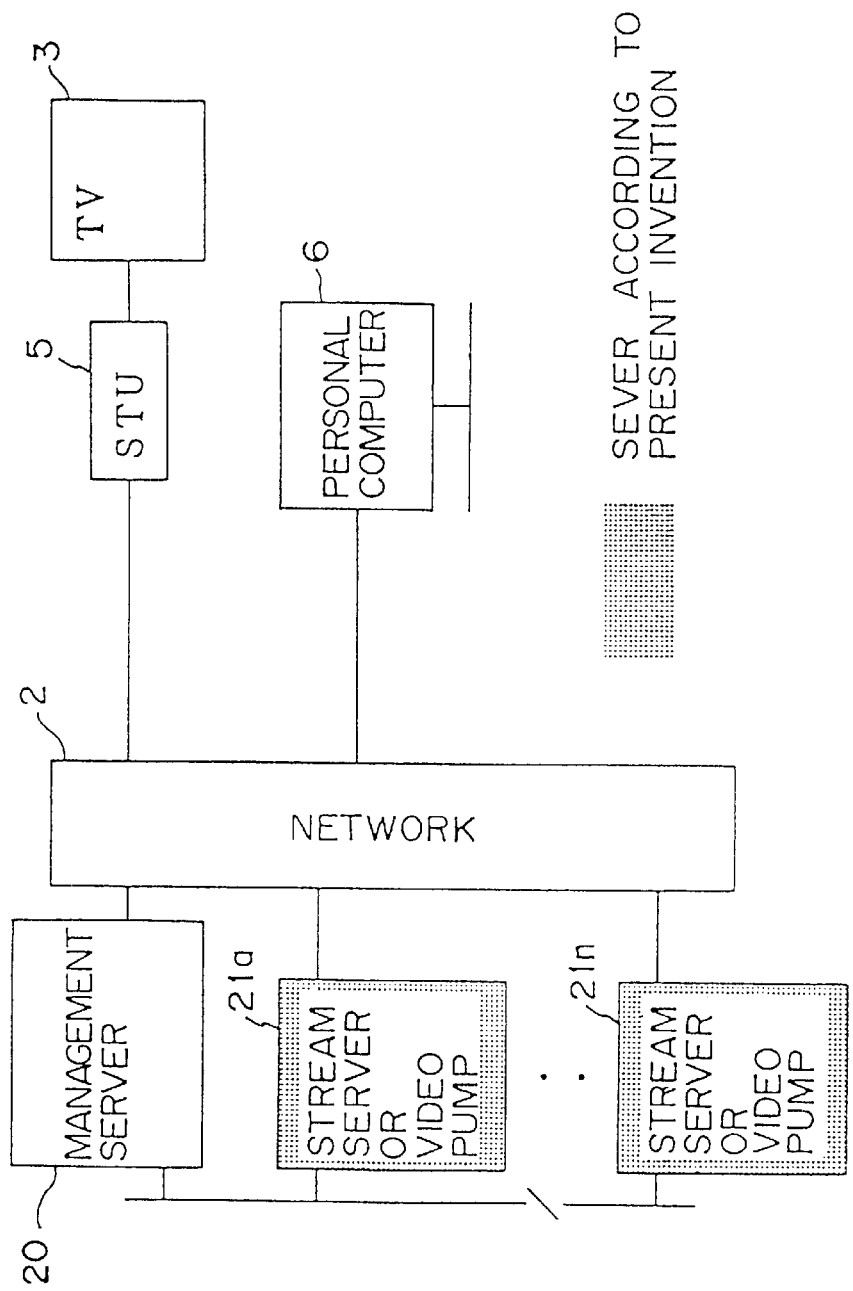
FIG. 4 is a block diagram showing an overall structure of a video-on-demand system that accomplishes a picture playback position detecting system according to the present invention.

FIG. 4 is a block diagram showing the overall structure of the video-on-demand system that accomplishes the picture playback position detecting system according to the present invention. Unlike with the video-on-demand system shown in FIG. 1, a video-on-demand center shown in FIG. 4 is composed of a management server 20 and a plurality of stream servers or a plurality of video pumps 21*a* to 21*n*. Each of the stream servers or video pumps 21*a* to 21*n* substantially stores picture/sound data and provides a user with the data through a network 2 corresponding to a request received from the user.

Figure 5:
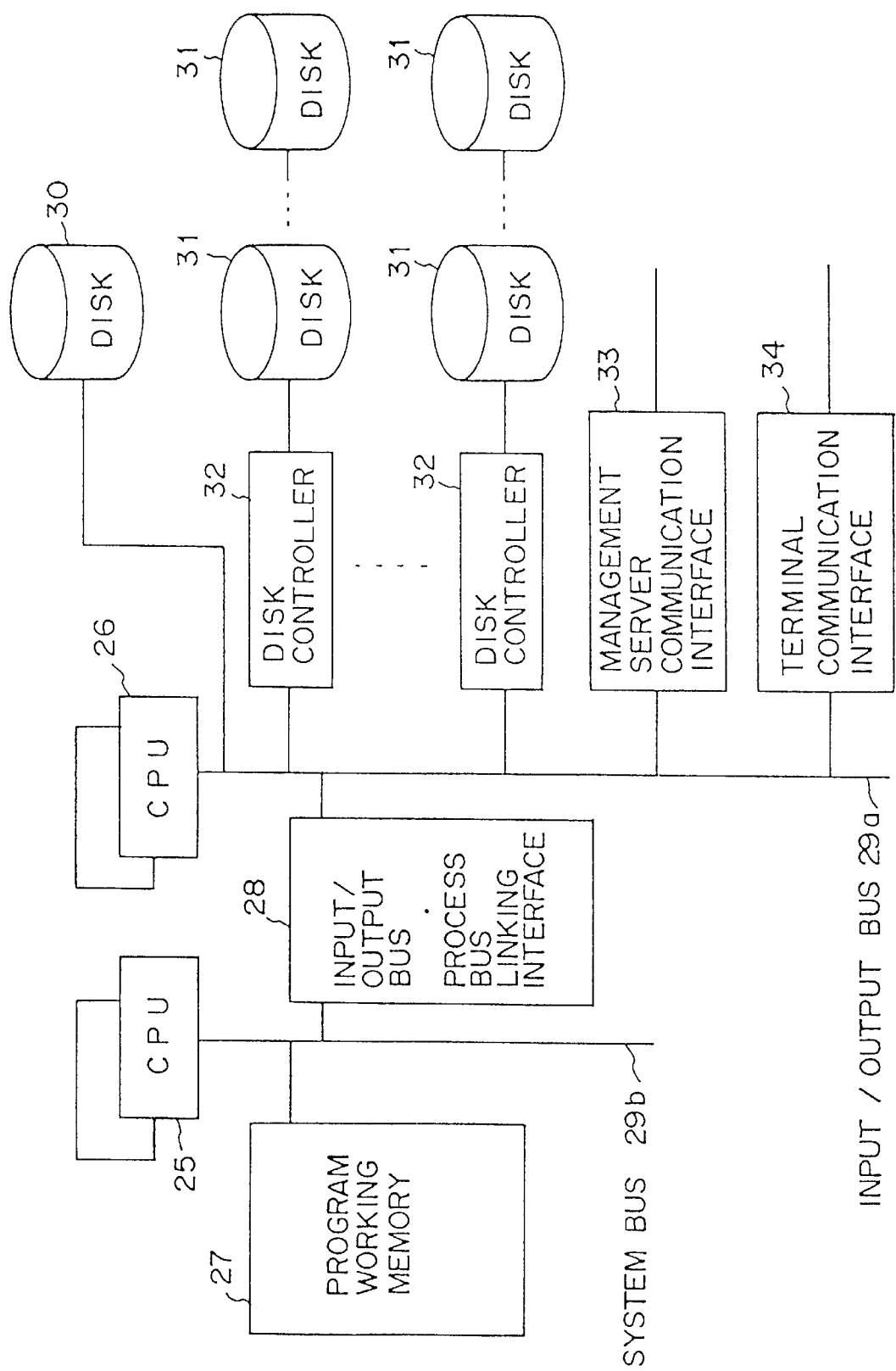
FIG. 5 is a block diagram showing a hardware structure of a video pump/stream server.

FIG. 5 is a block diagram showing a hardware structure of the video pump/stream server. Referring to FIG. 5, a first CPU 25 executes overall program processes. A second CPU 26 controls data input/output processes. A program working memory 27 stores data such as playback state management data (that will be described later). An input/output bus—process bus linking interface 28 is an interface between an input/output bus 29*a* and a system bus 29*b*. The picture data playback start position detecting unit 11 shown in FIG. 3 accords with the CPU 26 shown in FIG. 5, whereas the picture data storing unit 10 shown in FIG. 3 accords with the disk 31 shown in FIG. 5.

The disk 30 stores picture management data (that will be described later). Real picture/sound data is stored on a plurality of disks 31. Data input/output operations for the disks 31 are controlled by a plurality of disk controllers 32. A management server communication interface 33 is an interface to communicate with the management server 20 shown in FIG. 4. A terminal communication interface 34 is an interface to communicate with a set top unit 5 or a personal computer 6.

Figure 6:
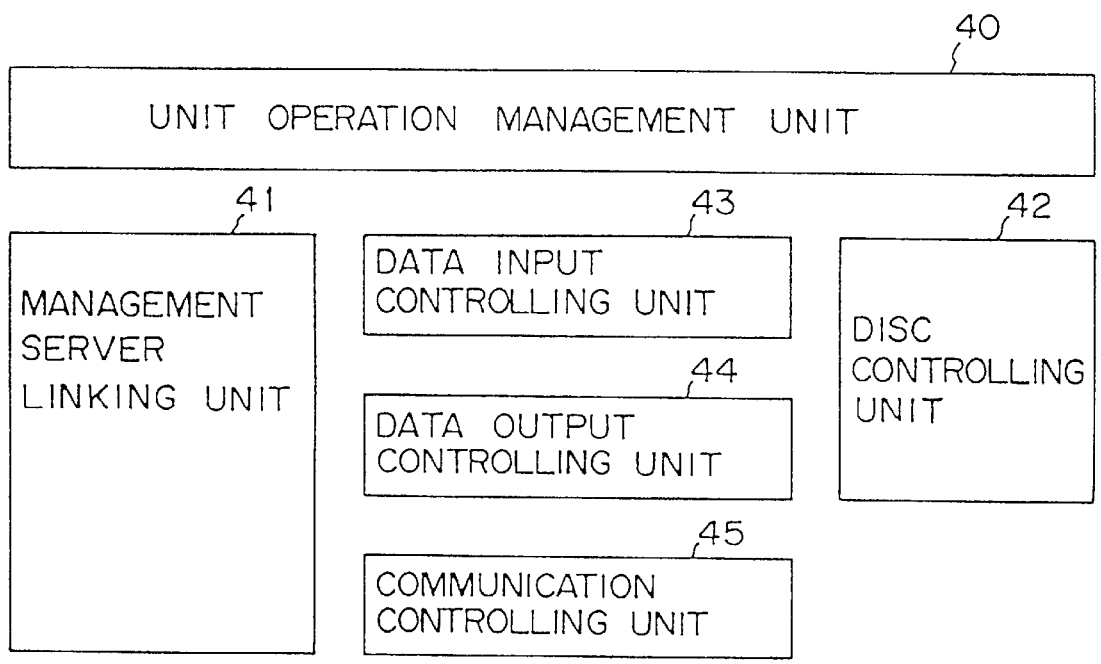
FIG. 6 is a schematic diagram showing a software structure of the video pump/stream server.

FIG. 6 is a block diagram showing a software structure of the video pump/stream server. Referring to FIG. 6, a unit operation management unit 40 includes an operating system that manages the overall system. A management server linking unit 41 performs a process in association with the process of the management server. A disk controlling unit 42 controls a disk 31 shown in FIG. 5. A data input controlling unit 43 and a data output controlling unit 44 control a data input operation and a data output operation for the disk 31. A communication controlling unit 45 controls a communication between the management server and the terminal side. The picture playback position detection according to the present invention and the output of picture/sound data corresponding thereto are mainly performed by the data output controlling unit 44.

Figure 7:
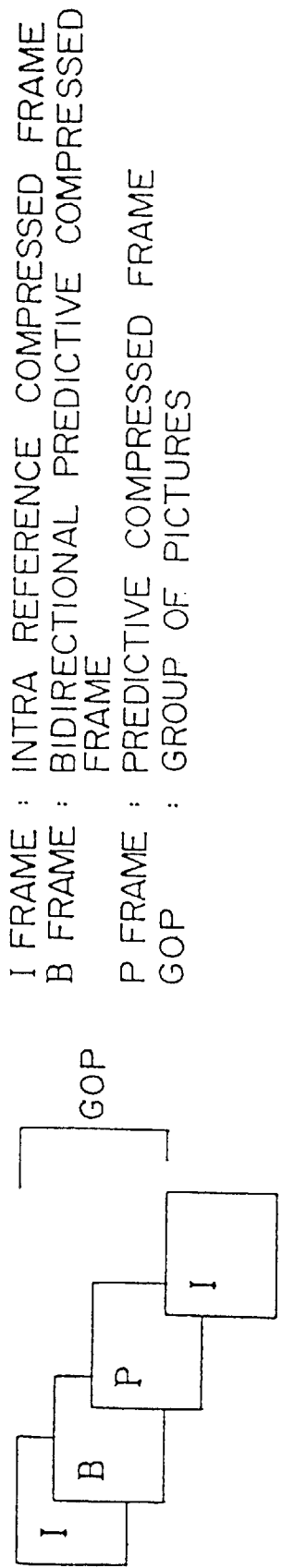
FIG. 7 is a schematic diagram for explaining a minimum playback block of digital picture data corresponding to the MPEG system.

FIG. 7 is a schematic diagram for explaining minimum playback blocks of digital picture data according to the MPEG method as an encoding method. As an encoding method for a video signal, a combination of three methods, namely the motion compensation inter-frame predicting method, orthogonal converting method (such as the discrete cosine transform method), and variable length encoding method is used. In the present embodiment, the MPEG method, that is an encoding method for effectively storing video signals on a digital data storing medium, such as a CD-ROM, is used.

In the MPEG2 method that is one of the MPEG methods, three encoding modes have been defined. Frames corresponding to these modes are referred to as I (Intra) frame, P (Predictive) frame, and B (Bidirectionally predictive) frame. The I frame is a frame as a result of the conventional intra-frame encoding process. The P frame is a frame as a result of an inter-frame predictive encoding process based on the same video signal sequence as H.261, that is an encoding method for N-ISDN. The B frame is a frame interpolation predictive encoding process used for predicting frames before and after a video signal.

In the MPEG2 method, picture data is encoded in such a manner that a plurality of B frames and a plurality of P frames are inserted between the I frames. A plurality of frames from one I frame to a frame just followed by the next I frame are referred to as minimum playback picture block GOP (Group Of Pictures). Although the picture data is compressed, the picture playback time period for one GOP is not constant, the picture data is encoded in such a manner that the number of GOPs in a predetermined time period (for example, one second) becomes eight.

Figure 8:
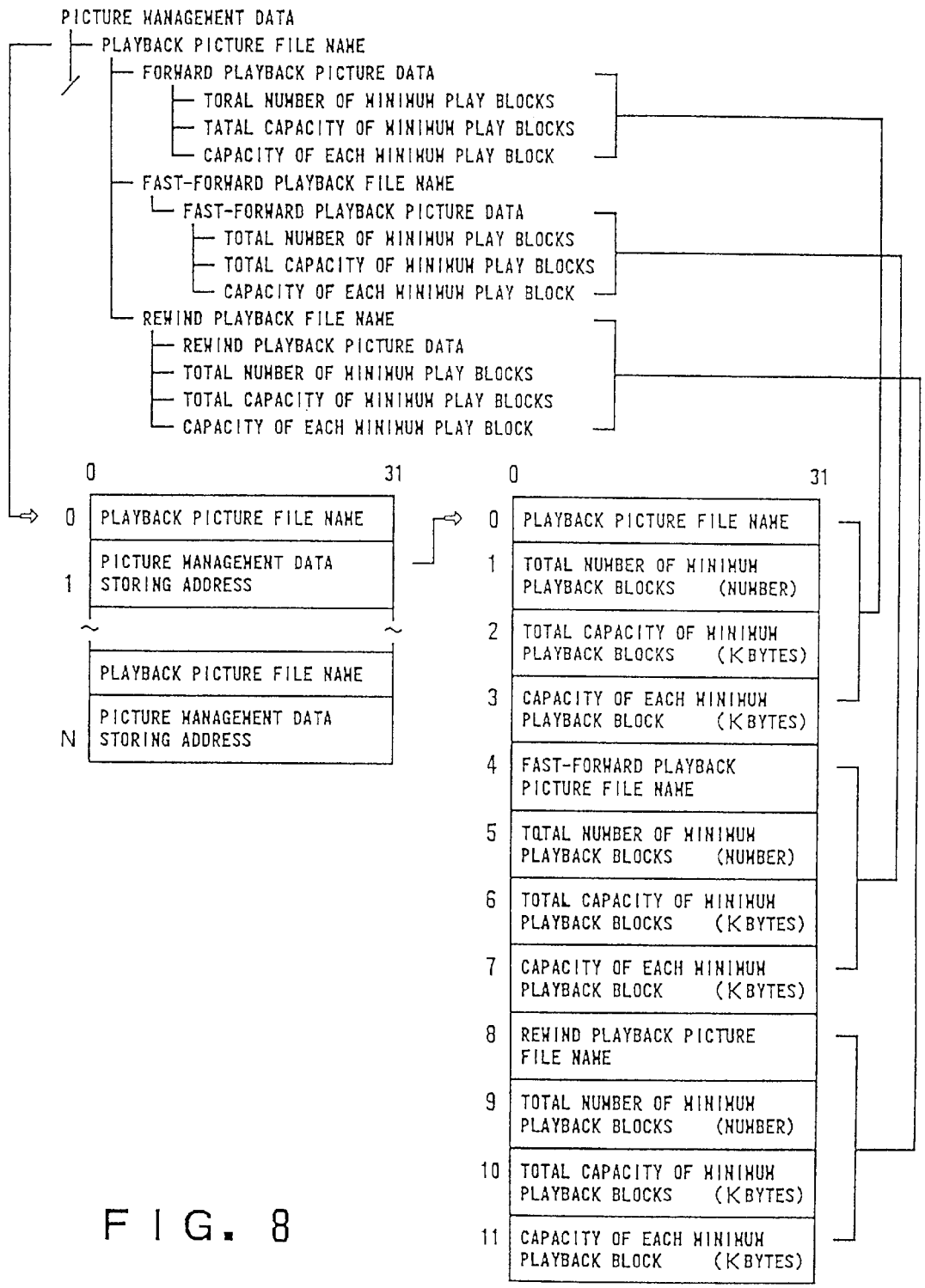
FIG. 8 is a schematic diagram for explaining picture management data for stored picture data.

FIG. 8 is a schematic diagram showing picture management data corresponding to picture data stored in each of the stream servers/video pumps 21a to 21n shown in FIG. 4. The upper portion of FIG. 8 shows the structure of the picture management data corresponding to each playback file name (for example, picture management data corresponding to each movie program).

There are two picture/sound playback methods for use with video-on-demand systems. In the first method, one type of digital picture/sound data is used. In the second method, three types of digital picture/sound data are used that include picture/sound data for the fast-forward playback operation and picture/sound data for the rewind playback type. In the first method, with conventional playback digital data (for example, data corresponding to one video tape), when the fast-forward playback operation is performed, picture data is skipped to a particular position corresponding to a predetermined speed and a normal playback operation is performed. Thereafter, the picture data is skipped to the next position and then the playback operation is performed. In the rewind playback operation, the same operations are performed in the reverse direction. However, in this method, since picture data is not continuously displayed (as with still pictures), picture quality deteriorates.

On the other hand, in the method using digital data for the fast-forward playback operation and digital data for the rewind playback operation, along with digital data for the normal playback operation, corresponding to the relation between the speed of the digital data for the regular playback and the speed of the digital data for the fast-forward playback operation, the playback position of the picture data for the regular playback operation is switched to the playback position of the picture data for the fast-forward playback operation so as to perform the fast-forward playback operation. Thus, picture data can be smoothly displayed. Consequently, the user can see the picture data as with the conventional video cassette recorder. In the embodiment, either of the two methods can be used. However, in the following description, the method using the three types of digital data will be explained.

Thus, the picture management data shown in the upper half of FIG. 8 is composed of picture data for a forward playback operation corresponding to a playback picture file name, picture data for a fast-forward playback operation corresponding to a fast-forward playback file name, and picture data for a rewind playback operation corresponding to a rewind playback file name. Each of the three types of picture data is composed of data representing the total number of GOPs, the total capacity thereof, and the capacity of the minimum playback block shown in FIG. 7.

The lower half of FIG. 8 shows a storing format of picture data in the memory. Corresponding to each playback picture file name on the left side of FIG. 8, a picture management data storing address (namely, the leading address of the storing area of the memory) that represents a pointer to an area where the contents of the picture management data are stored.

An area according to a picture management data storing address (this area is equivalent to a pointer) is shown on the right side of FIG. 8. In the area, corresponding to three playback picture file names, data that represents the total number of minimum playback blocks (number), the total capacity of minimum playback blocks (Kbytes), and the capacity of each minimum playback block (Kbytes) is stored.

Figure 9:
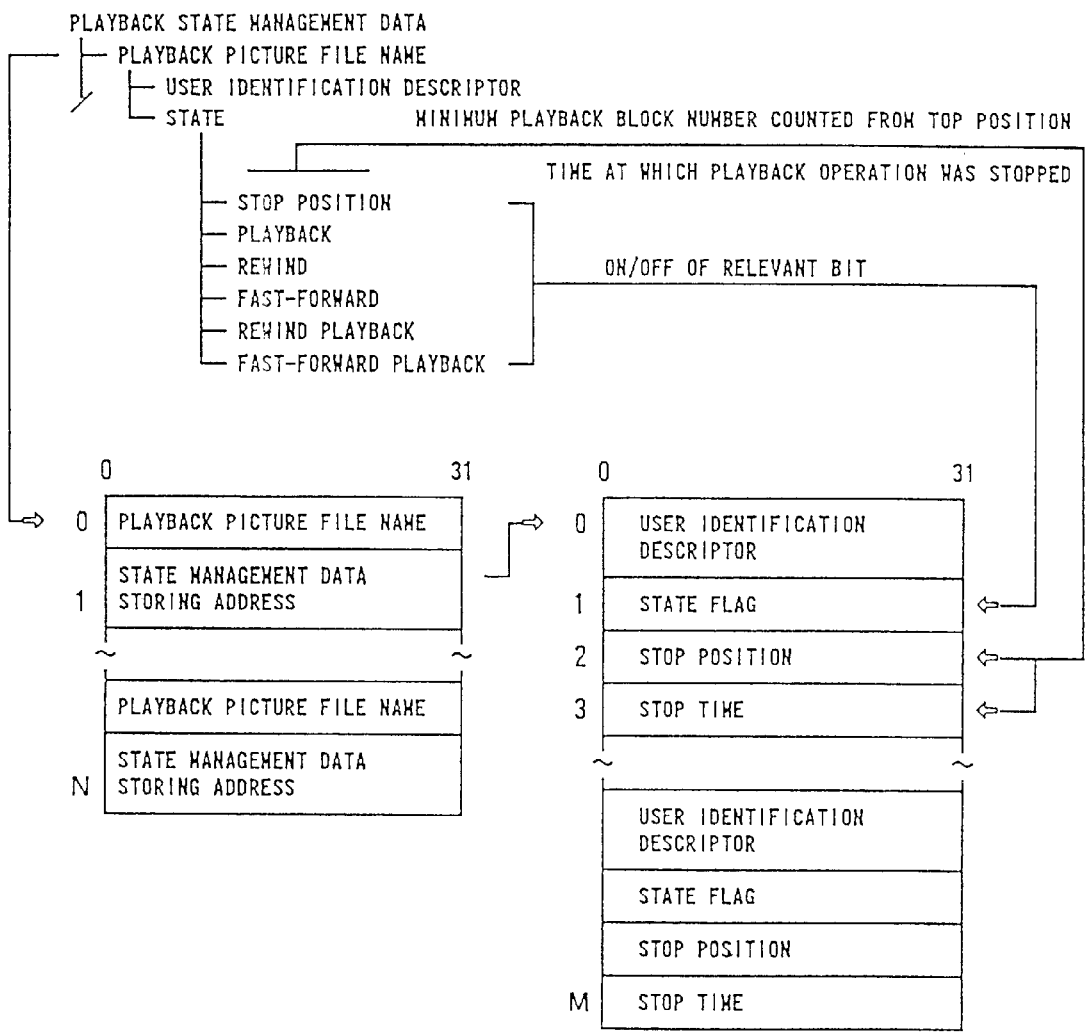
FIG. 9 is a schematic diagram for explaining playback state management data of one playback picture file.

FIG. 9 is a schematic diagram for explaining playback state management data that represents the state in which picture data of one movie program is used corresponding to a request received from each user. The playback state management data is stored on a disk 30 shown in FIG. 5 and is used to detect a playback start position corresponding to a request received from each user.

The upper portion of FIG. 9 shows a structure of playback state management data. This data is composed of data indicating a user identification descriptor corresponding to each user that uses the playback picture file, and data indicating a state corresponding to a playback picture file. The state data represents ON/OFF states of bits corresponding to flags for a stop operation, a playback operation, a rewind operation, a fast-forward operation, a rewind playback operation, and a fast-forward playback operation, the stop position in the stop state, and the stop time. In the case of, for example, the rewind operation, the stop time represents the time at which the playback operation is stopped before the rewind operation is performed. The stop position represents the order of the current minimum playback unit of the picture data at which the playback operation is stopped. As will be described later, in the present embodiment, when digital picture data is stored on a disk, since one GOP is stored in each fixed-length area (block) on the disk, it is possible to regard the order of the GOPs as the order of blocks.

The lower portion of FIG. 9 shows a storing format of the playback state management data in the memory. As with the format shown in FIG. 8, corresponding to each playback picture file name, a pointer that represents a state management data storing address (namely, the leading address of the storing area of real management data in the memory) is stored. A user identification descriptor, a state flag, a stop position, and a stop time are stored in an area represented by the pointer.

Figure 2:
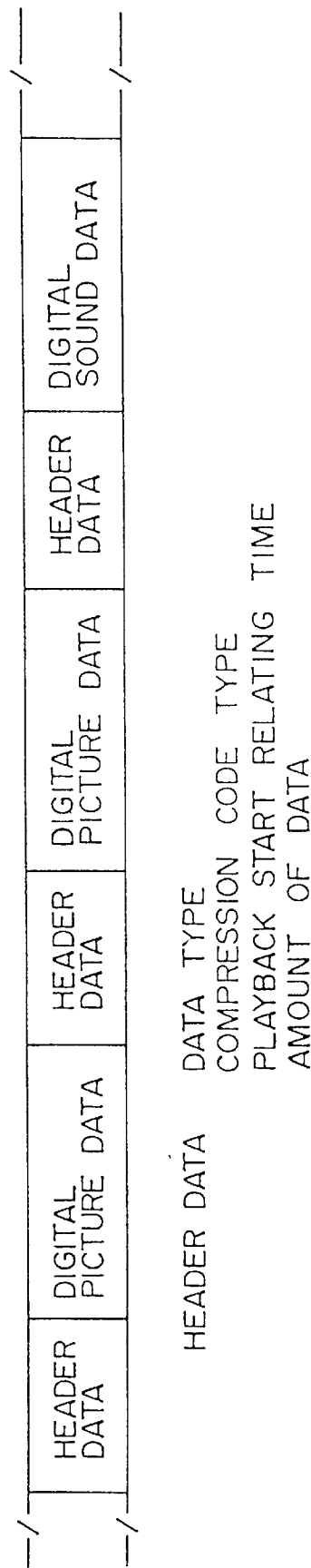
FIG. 2 is a schematic diagram showing an example of a format of conventional digital picture data and conventional digital sound data.
Figure 10:
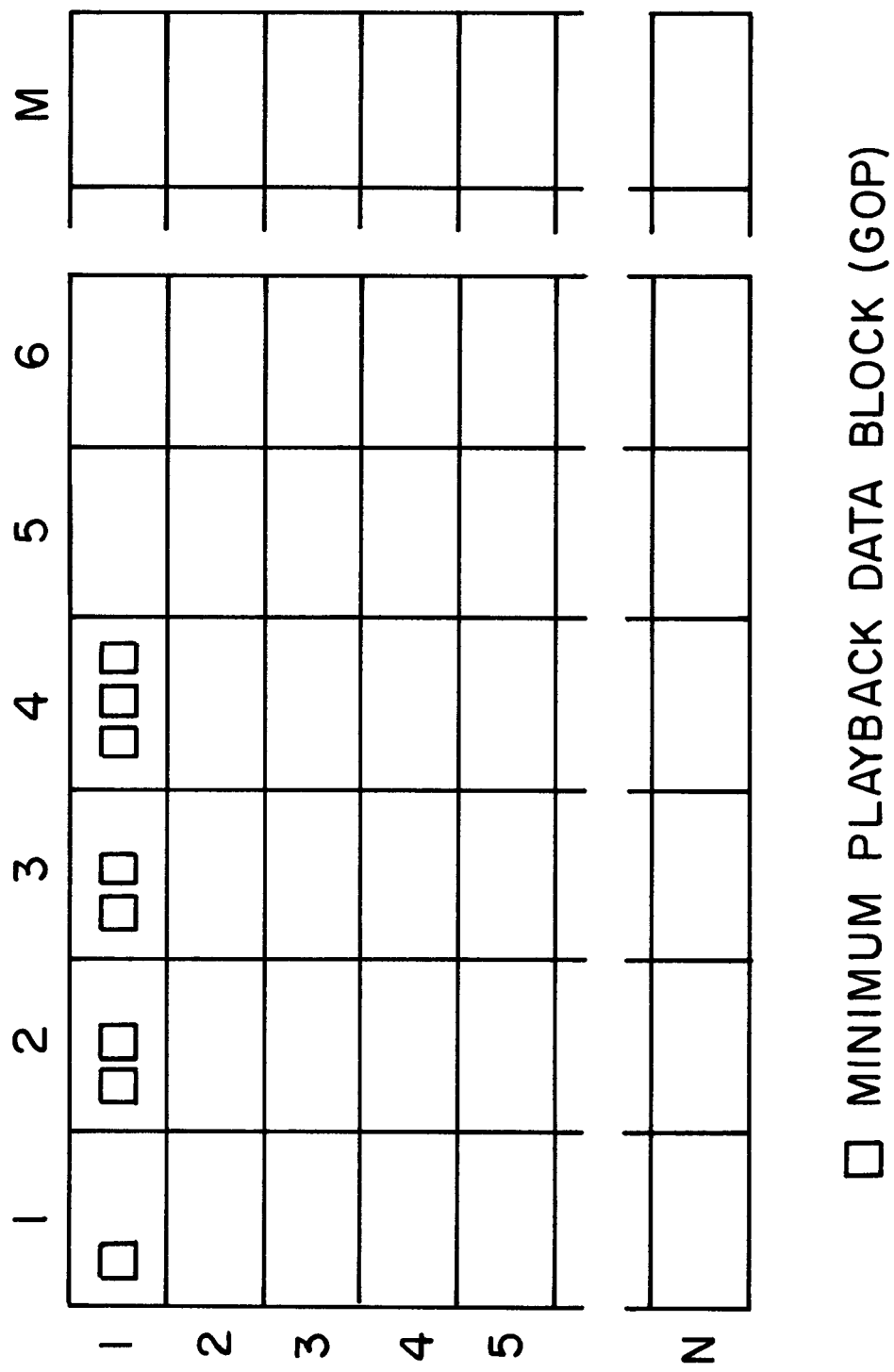
FIG. 10 is a schematic diagram for explaining a method for storing digital picture/sound data on a disk.

FIG. 10 is a schematic diagram for explaining a method for storing digital picture/sound data on a disk according to the embodiment of the present invention. In FIG. 10, the data storing area of the disk is divided into M×N fixed-length areas. Minimum playback blocks (GOPs) of digital picture/sound data are successively stored in the areas one by one. As described above, the playback time for each GOP varies. However, in the MPEG2 method, picture data is encoded in such a manner that four GOPs or eight GOPs are stored per second. Even if the length of each GOP and the playback start relative time in the header data shown in FIG. 2 are unknown, corresponding to blocks that include four or eight GOPs, the playback start position of picture data can be detected. In FIG. 10, one block may include two or three black squares. These black squares represent the data amount of each GOP rather than the number of GOPs.

FIG. 11 is a schematic diagram for explaining a method for storing picture/sound data on a disk corresponding to the three-types-of-data method, using digital data for the fast-forward playback operation and digital data for the rewind playback operation along with digital data for the forward playback operation. In FIG. 11, the forward playback data is composed of 256 fixed-length areas, that is, blocks on a disk. Data of eight blocks is played back per second. As with the format shown in FIG. 8, although the number of GOPs in each block is one, the total amount of data in each of the rows 1 and 2 in this example, that is, 8 blocks, is constant corresponding to 18 black squares.

The speed of the fast-forward operation and the rewind operation is eight times higher than that of the forward playback operation. The total number of blocks of each of the data for the fast-forward playback operation and of the data for the rewind playback operation is 32. Both the fast-forward playback time and the rewind playback time for eight blocks is one second.

Figure 12:
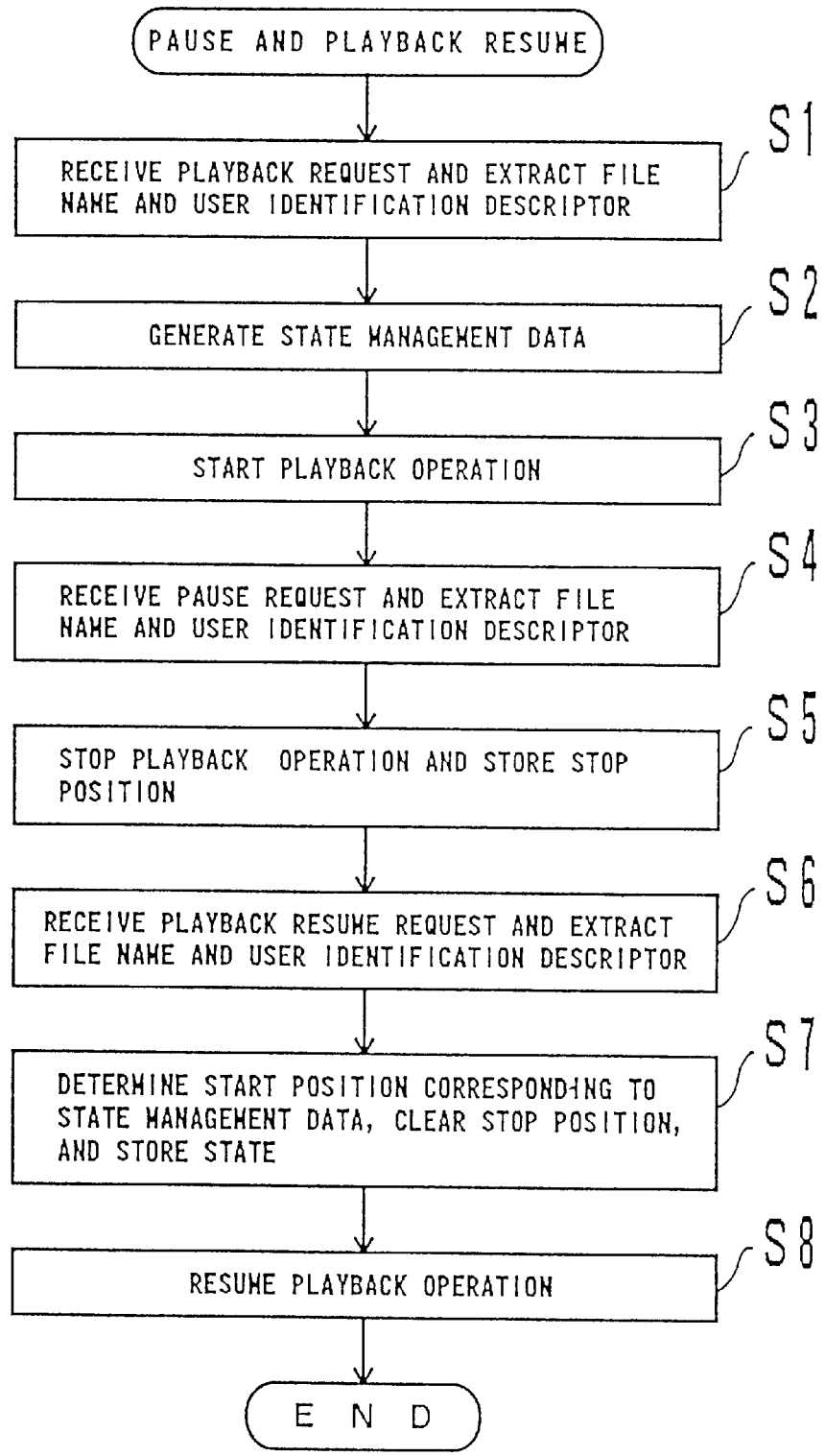
FIG. 12 is a operating flow chart showing a process in which a playback resume operation is performed after a pause operation.

FIG. 12 is a flow chart showing a process in which a playback resume operation is performed after a pause operation, according to the embodiment of the present invention. In FIG. 12, when the process is started, at step S1, a playback request (namely, a forward playback request) is received from a user. A playback picture file name and a user identification descriptor shown in FIG. 9 are extracted from the request. At step S2, state management data is generated. At step S3, the forward playback operation is started.

At step S4, when a pause request is received from the user while the forward playback operation is being performed, a file name and a user identification descriptor are extracted from the request. At step S5, corresponding to the request, the playback operation is stopped. The flag that represents the stop operation (shown in FIG. 9) is turned on. The stop position is stored.

At step S6, when a playback resume request is received from the user, a file name and a user identification descriptor are extracted from the request. At step S7, corresponding to the file name and the user identification descriptor, the playback start position is extracted from the state management data shown in FIG. 9. In this case, since the playback resume process is performed from the block after the paused block, the playback operation is resumed from a block after the stop position. However, it should be noted that the playback operation may be resumed from a block that is earlier than the stop position for several blocks depending on a delay in the system. Thereafter, the stop position shown in FIG. 9 is cleared and the bit that represents the playback operation is turned on. At step S8, the playback operation is resumed and then the process is completed.

Figure 13:
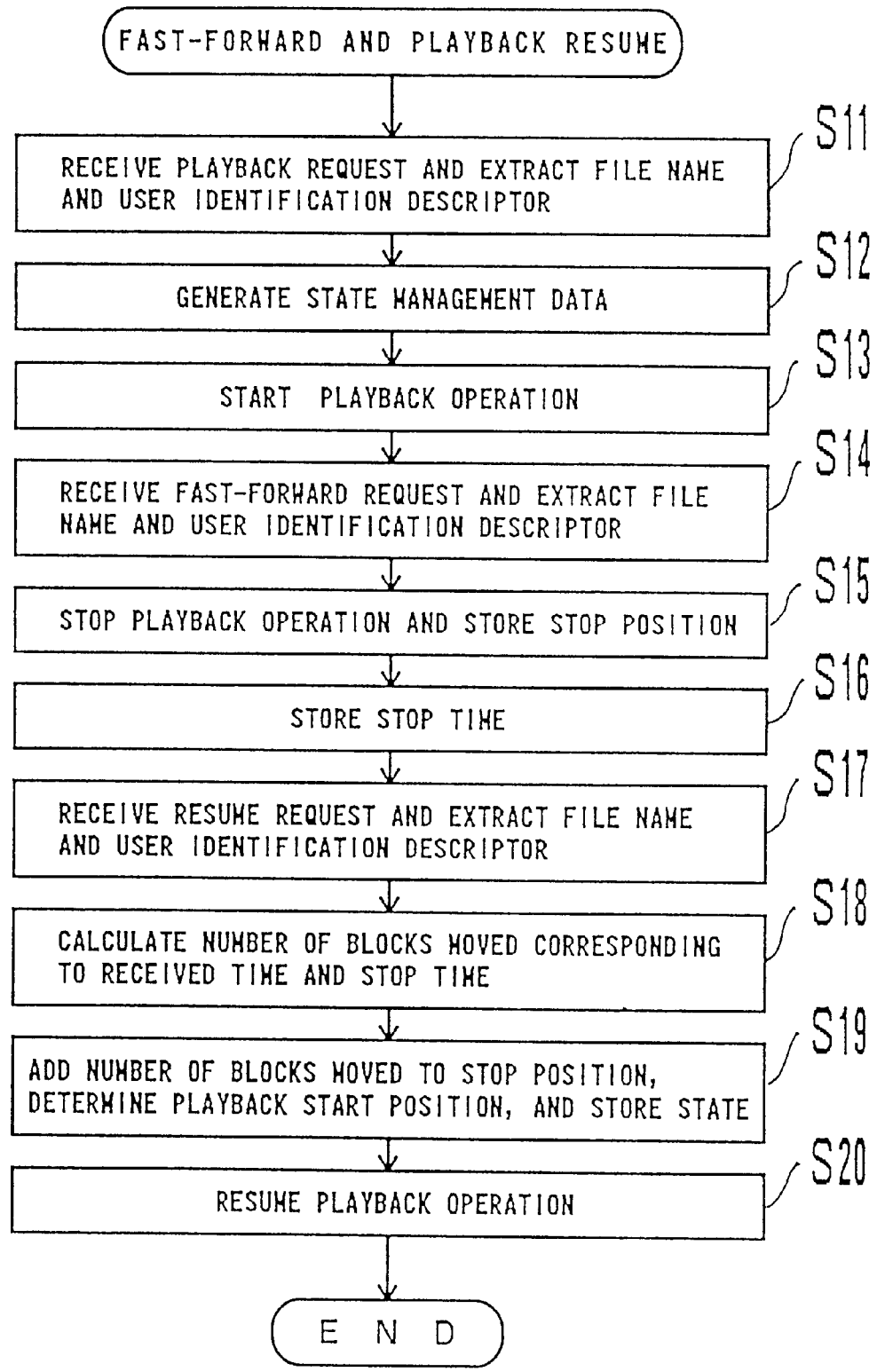
FIG. 13 is a flow chart showing a process in which a playback resume operation is performed after a fast-forward operation.

FIG. 13 is a flow chart showing a process in which a playback resume operation is performed after a fast-forward operation. In the process, while the forward playback operation is being performed, a fast-forward request for performing the fast-forward operation, rather than the playback operation, is received, and then the playback operation is resumed corresponding to a resume request. Steps S11 to S13 shown in FIG. 13 are the same as steps S1 to S3 in FIG. 12, respectively.

At step S14, when a fast-forward request is received from a user while the forward playback operation is being performed, a playback picture file name and a user identification descriptor are extracted from the request. At step S15, the playback operation is stopped as with step S5. Likewise, state management data is stored. At step S16, stop time is stored. Since this process is not the fast-forward playback process, even if three types of digital data including the picture data for the fast-forward playback operation are used, the picture data for the fast-forward playback operation is not used.

At step S17, when a playback resume request is received from the user, a file name and a user identification descriptor are extracted from the request. Corresponding to the request received time at step S18 and the stop time stored at step S16, the number of blocks moved in the picture/sound data is obtained. The number of blocks moved is obtained by the following formula.

Number of blocks moved=N×(resume request received time−stop time)

where N is the number of blocks corresponding to a predetermined fast-forward speed (blocks per second).

At step S19, the number of blocks moved is added to the stop position stored at step S15. Thus, the playback resume position is designated. The bit that represents the playback state is turned on. At step S20, the playback operation is resumed and the process is completed.

FIG. 14 is a flow chart showing a process in which a playback resume operation is performed after a rewind operation. In FIG. 14, a rewind request is received from a user while a forward playback operation is being performed. Thereafter, a playback resume request is received from the user. This process differs from the process shown in FIG. 13 in that the fast-forward operation is substituted with the rewind operation.

At step S24, a rewind request instead of the fast-forward request at step S14 is received from the user. At step S28, a predetermined rewind speed is used instead of the fast-forward speed at step S28 so as to calculate the number of blocks moved. At step S29, the number of blocks moved is subtracted from the stop position so as to determine the playback start position, unlike with step S19.

Figure 15:
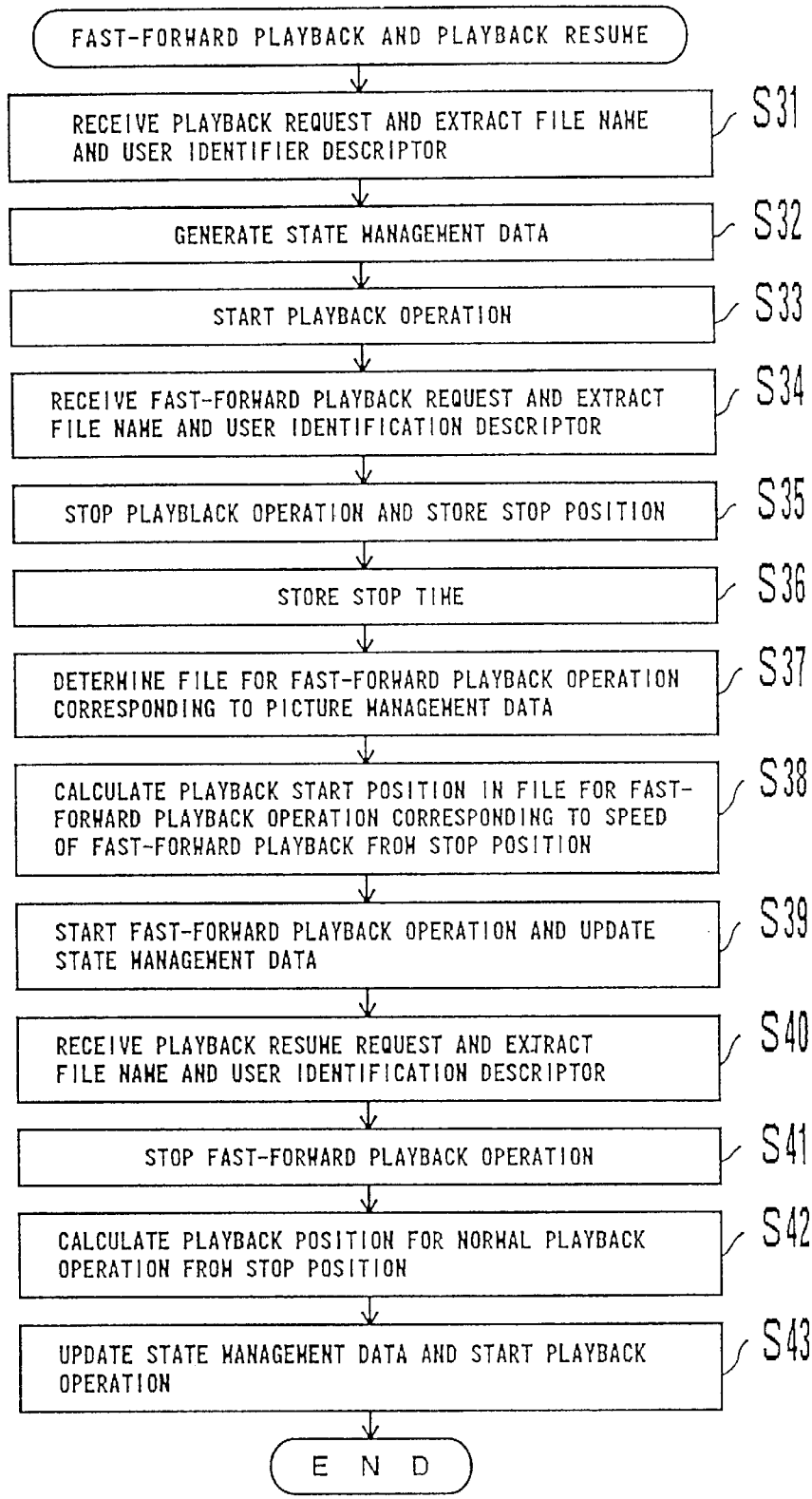
FIG. 15 is a flow chart showing a process in which a playback resume operation is performed after a fast-forward playback operation.

FIG. 15 is a flow chart showing a process in which a playback resume operation is performed after a fast-forward playback operation. Steps S31 to S36 shown in FIG. 15 are same as steps S11 to S16 shown in FIG. 13, respectively, except that a fast-forward playback request is received from the user at step S34 shown in FIG. 15.

However, in this process, since the fast-forward playback operation is performed, a fast-forward playback file name is determined corresponding to picture management data at step S37. In this case, it is assumed that three files, including a file for the fast-forward playback operation and a file for the rewind playback operation as well as a file for the normal playback operation, are used. In this case, to obtain the start position of the fast-forward playback operation in the determined file for the fast-forward playback operation, at step S38, the playback start position in the file for the fast-forward playback operation is obtained corresponding to the fast-forward playback speed. The playback start position in the file for the fast-forward playback operation is obtained by dividing the stop position in the file for the normal playback operation by a coefficient corresponding to the fast-forward speed, and changing the quotient to a relevant integer as given by the following equation.

Playback start position=[stop position÷coefficient] (where [ ] represents a function for changing a given number to a relevant integer)

As described above, when one block of digital data for the fast-forward playback operation accords with eight blocks of digital data for the forward playback operation, the coefficient corresponding to the speed of the fast-forward operation is 8.

When the playback start position in the file for the playback operation is obtained, at step S39, the fast-forward playback operation is started. The bit that represents the fast-forward playback operation in the state management data is turned on. Thereafter, at step S40, a playback resume request is received from the user. After a file name and a user identification descriptor are extracted from the request, at step S41, the fast-forward playback operation is stopped. At step S42, the playback start position in the file for the normal playback operation is obtained corresponding to the stop position in the file for the fast-forward playback operation.

Unlike with step S38, the playback start position of the normal playback operation is obtained by multiplying the stop position in the file for the fast-forward operation by the above-described coefficient. In the case shown in FIG. 11, by multiplying the block number of the stop position of the data for the fast-forward playback operation by 8, the playback start position of the data for the forward playback operation can be obtained. At step S43, the bit that represents the playback operation of the state management data is turned on. Thereafter, the playback operation is started and then the process is completed.

When the system is operated with only the file for the normal playback operation, steps S37, S38, and S42 are not required. The fast-forward operation at the predetermined speed of the fast-forward operation is performed with the file for the normal playback operation and then the normal playback operation is performed.

Figure 16:
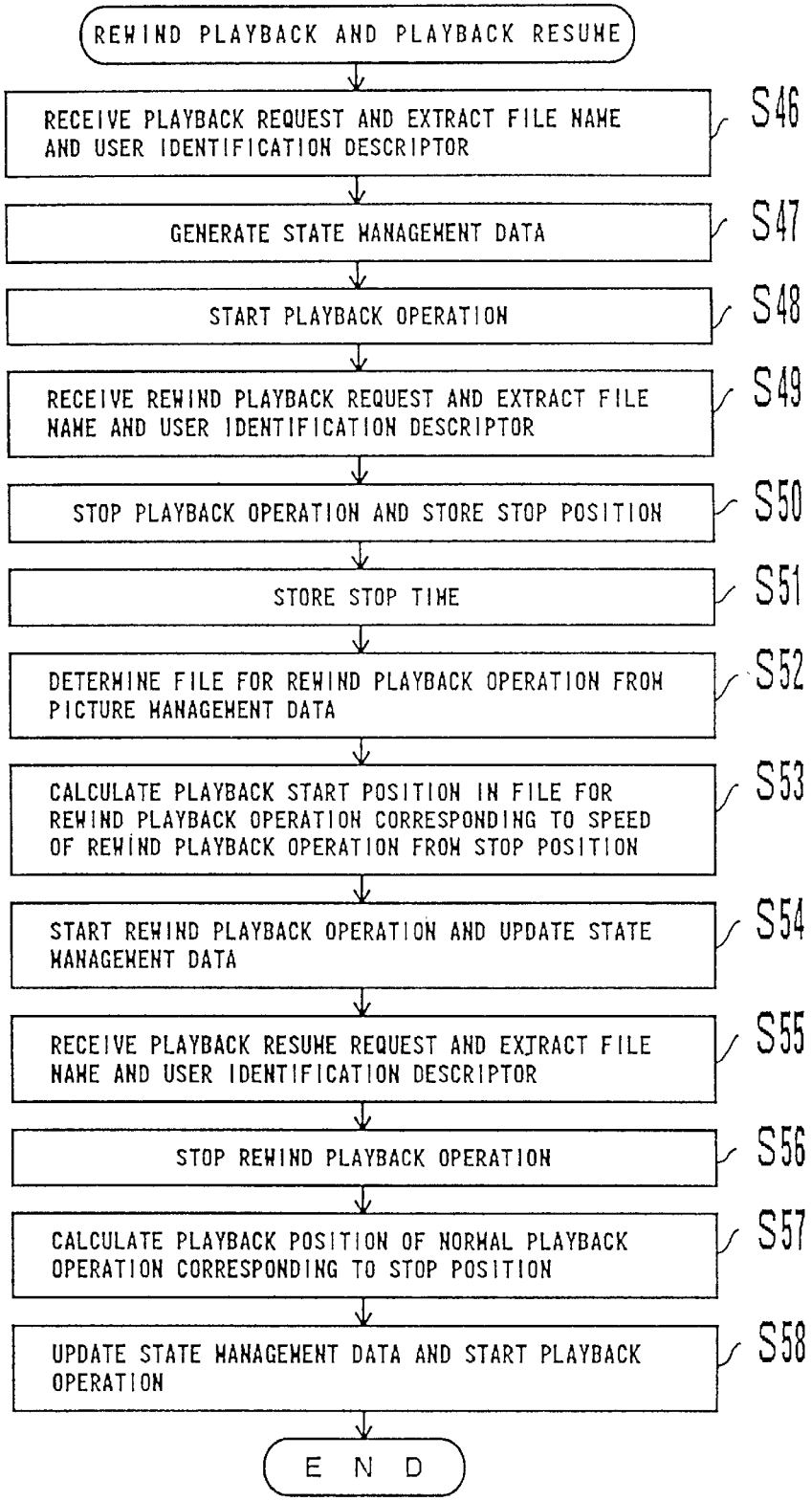
FIG. 16 is a flow chart showing a process in which a playback resume operation is performed after a rewind playback operation.

FIG. 16 is a flow chart showing a process in which a playback resume operation is performed after a rewind playback operation. Unlike with the process shown in FIG. 15, in the process shown in FIG. 16, at step S49, a rewind playback request is received from a user. At step S52, a file for the rewind playback operation is determined. At step S54, a rewind playback operation is started. In addition, a bit that represents the rewind playback operation is turned on. At step S53, the playback start position in the file for the rewind playback operation is calculated. At step S57, the playback start position of the normal playback operation is obtained from the stop position in the file for the rewind playback operation. However, picture data for the rewind playback operation is stored in the reverse order so that the last of the picture data for the forward playback operation is stored at the start of the file. Thus, at steps S53 and S57, the position is obtained in the different manner from that at steps S38 and S42.

Figures 17A, 17B:
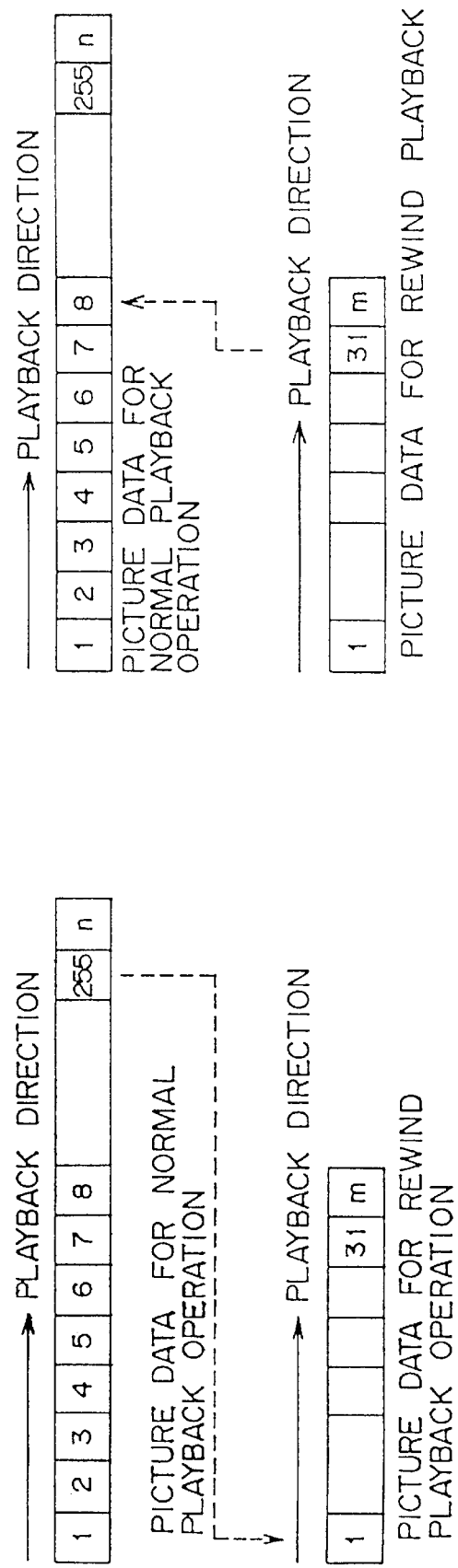
FIGS. 17A and 17B are schematic diagrams for explaining detections of a playback start position on a rewind playback file and a playback start position of a normal playback operation.

FIGS. 17A and 17B are schematic diagrams for explaining a method for calculating the playback start position in the file for the rewind playback operation at step S53 and the playback start position in the file for the normal playback operation at step S57. FIG. 17A is a schematic diagram for converting the playback stop position in the file for the normal playback operation into the playback start position in the file for the rewind playback operation. The playback start position in the file for the rewind playback operation can be calculated with the above-described coefficient using the following equation.

Playback start position=total number of GOPs in the file for rewind operation−[stop position÷coefficient]

Assuming that the stop position in the picture file for the normal playback operation is the 255-th block counted from the start position (namely, the total number of GOPs [n]= 256), when the speed of the rewind playback operation is eight times higher than the speed of the normal playback operation, as shown in FIG. 11, the coefficient is 8. By rounding off the fraction of the quotient of which the stop position is divided by the coefficient, and changing the quotient to a relevant integer, the position of the playback start block in the file for the rewind playback operation (total number of GOPs [m]=32) becomes 1.

FIG. 17B is a schematic diagram for explaining a method for calculating the playback start position in the file for the normal playback operation from the stop position in the file for the rewind playback operation. This conversion can be performed by the following equation.

Playback start position =
total number of GOPs in the file for normal playback operation −
[stop position × coefficient]

In the case that the rewind playback operation is stopped at the 31-st block in the file for the rewind playback operation, by multiplying the stop position by 8, which is the coefficient, and subtracting the product from the total number of blocks in the file for the normal playback operation, "8" is obtained as the playback start position in the file for the normal playback operation.

When the system is operated with only a picture file for the normal playback operation, steps S52, S53, and S57 shown in FIG. 16 can be omitted, as in the case of the process for the fast-forward playback operation shown in FIG. 15.

Figure 18:
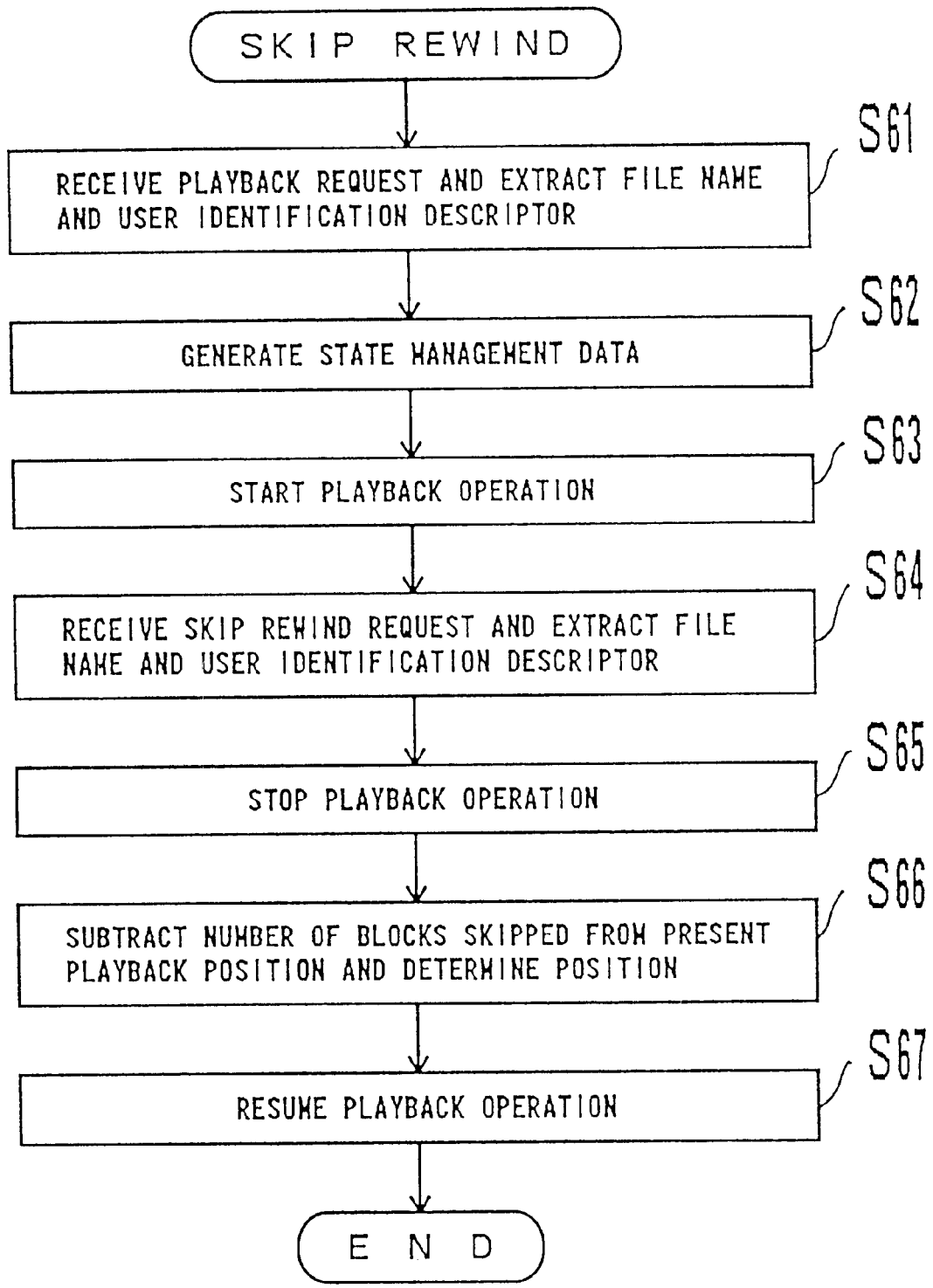
FIG. 18 is a flow chart showing a process in which a playback resume operation is performed after a skip rewind operation.

FIG. 18 is a flow chart showing a process for a skip rewind playback operation. In this process, a predetermined or designated number of blocks is rewound for skip. Thereafter, the playback operation is resumed.

When the process is started, at step S61, a normal playback request is received. A file name and a user identification descriptor are extracted from the request. At step S62, state management data is generated. At step S63, the playback operation is started.

Thereafter, at step S64, a skip rewind request is received. A file name and a user identification descriptor are extracted from the request. At step S65, the normal playback operation is stopped. At step S66, the number of blocks skipped is subtracted from the present playback position, and the playback resume position after the rewind operation is determined. At step S67, the playback operation is resumed and the process is completed.

Figure 19:
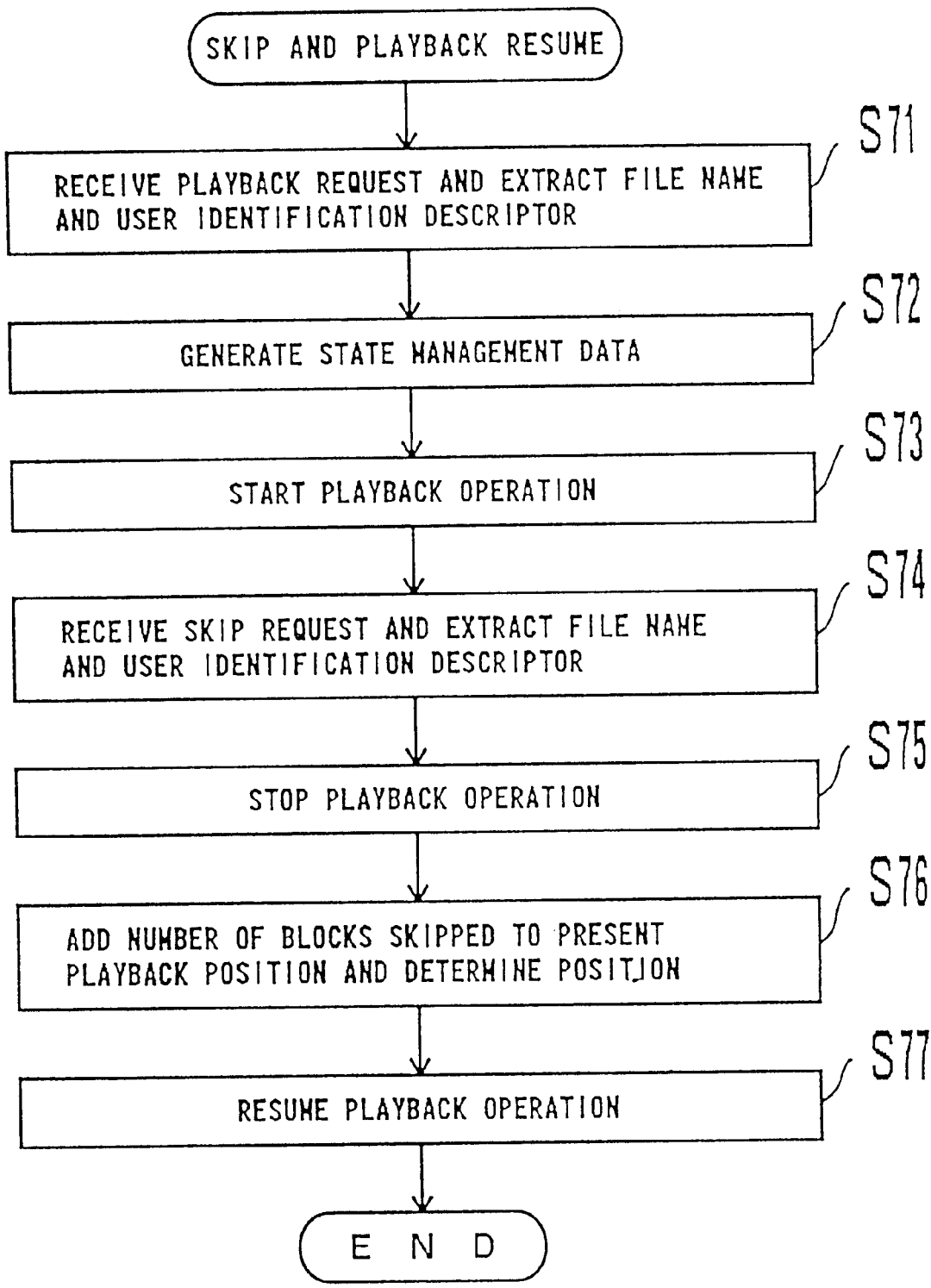
FIG. 19 is a flow chart showing a process in which a playback resume operation is performed after a skip operation.

FIG. 19 is a flow chart showing a process in which a playback resume operation is performed after a skip operation. In this process, a predetermined or designated number of blocks are skipped from the present playback position in the forward direction. Thereafter, the playback operation is resumed. The process shown in FIG. 19 is the same as the process shown in FIG. 18, except that a request received at step S74 is a forward skip request rather than the skip rewind request received at step S64, and that the result in which the number of blocks skipped at step S76 is added to the present playback position, is determined as the playback resume position.

Figure 20A:
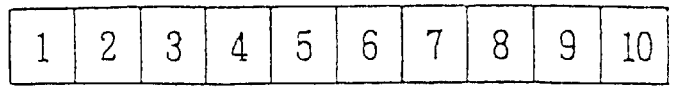
FIGS. 20A, 20B, 20C, and 20D are schematic diagrams for explaining a method for determining a playback resume position after the skip operation is performed in FIGS. 18 and 19.

FIGS. 20A to 20D are schematic diagrams for explaining the process in which the playback resume operation is performed after the skip rewind operation, and the process in which the playback resume operation is performed after the skip operation shown in FIGS. 18 and 19. FIG. 20A is a schematic diagram for explaining a method for determining the playback resume position in the process for the skip rewind operation. In the case that the number of blocks skipped is "3", when the skip rewind request is received and the playback position is "6", the playback resume position becomes "3".

Figure 20B:
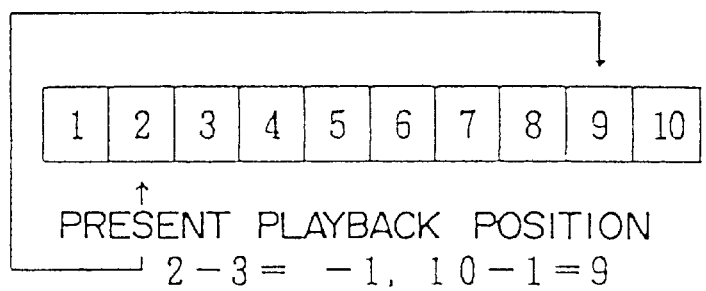

FIG. 20B is a schematic diagram for explaining a method for determining the playback resume position, in the case that a rewind skip operation causes the playback resume position to exceed the leading position of picture data. In this embodiment, when a skip rewind request is received, the result of which when the number of blocks skipped are subtracted from the present playback position is negative, the position at which the absolute value of the negative value is subtracted from the last block position, is determined as the playback resume position. When the present position is "2" and the number of blocks skipped is "3", the playback resume position becomes "9". However, when the computation in which the number of blocks skipped is subtracted from the present playback position outputs a negative result, the playback resume position may be treated as the first block of the picture data.

Figure 20C:
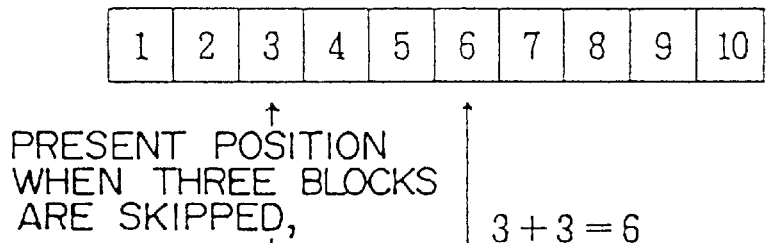

FIG. 20C is a schematic diagram for explaining a method for determining the playback resume position for the process in which the playback resume operation is performed after the forward skip operation. When the skip request is received, if the present position is "3" and the number of blocks skipped is "3", the playback resume position becomes "6".

Figure 20D:
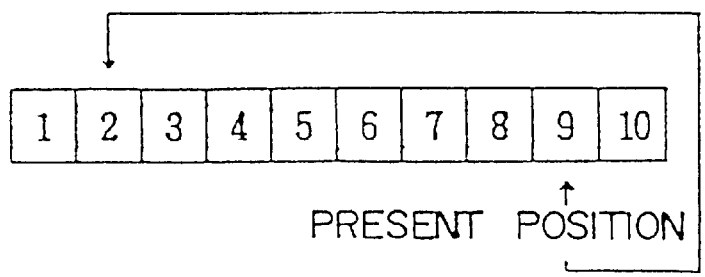

FIG. 20D is a schematic diagram for explaining a playback resume position in the case that the computation in which the number of blocks skipped is added to the present playback position outputs a result exceeding the last block. In this case, by adding the number of blocks skipped to the present position and subtracting the total number of blocks from the added result, the playback resume position is obtained. When the present position is "9" and the number of blocks skipped is "3", the playback resume position becomes "2". However, when the computation in which the present playback position is added to the number of blocks skipped outputs a result exceeding the last block, the playback resume position may be treated as the last block.

In the above-described embodiment, as an encoding method for picture data, the MPEG2 method was explained. However, the picture playback position detecting method according to the present invention is not limited to such an encoding method. Instead, various encoding methods can be used.

As encoding methods for digital data storing mediums, the MPEG1 method that is an encoding method for a digital storing medium at speeds of up to around 1.5 Mb/s, that was standardized by the ISO (International Organization for Standardization)/ITU (International Telecommunication Union), the MPEG2 method that is a higher standard then the MPEG1 method, and is a picture/sound encoding standard handling picture data to the HDTV level, the Indeo method that was proposed by Intel, and is a picture/sound encoding standard in which the compression/decompression processes are performed by software, the Quick Time method that was proposed by Apple, and is a picture/sound encoding standard in which the compression/decompression processes are also performed by software, and the Motion JPEG (Joint Photographic coding Expert Group) method of which JPEG of still picture standard proposed by the ISO are successively played back as moving picture data, and so forth, are known.

In these picture/sound coding standards, the amount of picture/sound data is compressed to around 1/100. In these standards, minimum playback blocks that are the same as GOPs in the MPEG2 method are used. Thus, the method for storing minimum picture blocks in each fixed-length area on a disk is not limited to a particular encoding method. In other words, the method according to the present invention can be applied to any encoding method.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A picture playback position detecting apparatus for use with a video-on-demand system for providing a user with pictures and sound through a network corresponding to a request received from the user on a provider side, the apparatus comprising:

picture data storing means for storing minimum playback picture blocks which are digital data of the pictures and which contain picture data for a predetermined time period in a predetermined number of said minimum playback picture blocks, in successive fixed-length areas in an order of playback of the minimum playback picture blocks, and for storing a predetermined number of minimum playback picture blocks in a predetermined number of fixed-length areas; and picture playback start position detecting means for detecting a storing position in said picture data storing means of picture data for starting a picture playback which is provided to the user, wherein said picture playback start position detecting means is adapted to detect a picture storing position corresponding to a playback resume request received from the user while the playback operation of the picture data is being paused after one of a fast-forward operation, a rewind operation, a fast-forward operation, a skip operation, or a skip rewind operation is performed, by multiplying a difference between a starting time of one of the fast-forward operation, the rewind operation, the fast-forward playback operation, the skip operation, or the skip rewind operation and a stopping time of one of these operations with a number of playback picture blocks per time unit.

2. The picture playback position detecting apparatus as set forth in claim 1, wherein in the case that a playback operation of the picture data is paused and then resumed corresponding to a request received from the user, said picture playback start position detecting means is adapted for detecting a storing position in said picture data storing means for the playback operation to be resumed.

3. The picture playback position detecting apparatus as set forth in claim 1, wherein said picture data storing means is adapted for storing picture data for a fast-forward playback operation along with the picture data for a normal playback operation; and wherein said picture playback start position detecting means is adapted for detecting a storing position in said picture data storing means for the playback start position of the picture data for the fast-forward playback operation corresponding to a playback stop position of the picture data for the normal playback operation and a coefficient that represents a mutual relation between storing positions counted from a first position in said picture data storing means for any picture data for the normal playback operation and the relevant picture data for the fast-forward playback operation when a fast-forward playback request is received from the user while the normal playback operation of the picture data is being performed.

4. The picture playback position detecting apparatus as set forth in claim 3, wherein said picture playback start position detecting means is adapted for detecting a storing position in said picture data storing means for a playback start position of the picture data for the normal playback operation corresponding to the playback stop position of the picture data for the fast-forward playback operation and the coefficient when a normal playback resume request is received from the user while the picture data for the fast-forward playback operation is being played back.

5. The picture playback position detecting apparatus as set forth in claim 3, wherein said picture data storing means is adapted for changing the coefficient and storing picture data for the normal playback operation and picture data for the fast-forward playback operation so as to vary a speed of the fast-forward playback operation.

6. The picture playback position detecting apparatus as set forth in claim 1, wherein said picture data storing means is adapted for storing picture data for a rewind playback operation along with the picture data for a normal playback operation; and wherein said picture playback start position detecting means is adapted for detecting a storing position in said picture data storing means for the playback start position of the picture data for the rewind playback operation corresponding to a playback stop position of the picture data for the normal playback operation and a coefficient that represents a mutual relation between storing positions counted from a first position in said picture data storing means for any picture data for the normal playback operation and the relevant picture data for the rewind playback operation when a rewind playback request is received from the user while the normal playback operation of the picture data is being performed.

7. The picture playback position detecting apparatus as set forth in claim 6, wherein said picture playback start position detecting means is adapted for detecting a storing position in said picture data storing means for a playback start position of the picture data for the normal playback operation corresponding to the playback stop position of the picture data for the rewind playback operation and the coefficient when a normal playback resume request is received from the user while the picture data for the rewind playback operation is being played back.

8. The picture playback position detecting apparatus as set forth in claim 6, wherein said picture data storing means is adapted for changing the coefficient and storing picture data for the normal playback operation and picture data for the rewind playback operation so as to vary a speed of the rewind playback operation.

9. The picture playback position detecting apparatus as set forth in claim 1, wherein minimum playback blocks of the digital picture data stored in said picture data storing means are obtained by any video signal digitizing method.

10. The picture playback position detecting apparatus as set forth in claim 1, wherein said picture playback start position detecting means is adapted for detecting storing positions in said picture data storing means for picture data to be played back when a plurality of playback requests for the same picture data are received from a plurality of users at the same time.

11. The picture playback position detecting apparatus as set forth in claim 1, wherein said picture playback start position detecting means is adapted for detecting storing positions in said picture data storing means for picture data to be played back when a plurality of playback requests for a plurality of types of picture data are received from a plurality of users at the same time.

12. A picture playback position detecting method for use with a video-on-demand system, comprising the steps of:

storing at least one minimum playback picture block in a fixed-length area, a predetermined number of the minimum playback picture blocks composing the digital picture data for a predetermined time period; and detecting a storing position in the fixed-length area for picture data with which the user is to be provided, whereby the user is provided with the picture data from the detected position as a playback start position, wherein the step of detecting the storing position is adapted to detect a picture storing position corresponding to a playback resume request received from the user while the playback operation of the picture data is being paused after one of a fast-forward operation, a rewind operation, a fast-forward playback operation, a skip operation, or a skip rewind operation is performed, by multiplying a difference between a starting time of one of the fast-forward operation, the rewind operation, the fast-forward playback operation, the skip operation or the skip rewind operation and a stopping time of one of these operations with a number of playback picture blocks per time unit.

13. The picture playback position detecting method as set forth in claim 12, further comprising the steps of:

storing at least one minimum playback picture block generated by compressing data corresponding to a predetermined number of frames of data into a fixed-length area; and searching the fixed-length area corresponding to time data so as to obtain the minimum playback picture block corresponding to the picture data at a designated time.

14. A picture playback position detecting apparatus for providing a user with pictures and sound through a network, comprising:

a picture data storage system to successively store playback picture blocks in a predetermined number of fixed-length data areas in an order of playback of the playback picture blocks, wherein a time period for playback is constant; and a picture playback start position detector to detect a storing position in said picture data storage system of picture data to start a picture playback, wherein said picture playback start position detector is adapted to detect a picture storing position corresponding to a playback resume request received from the user while the playback of the picture data is being paused after one of a fast-forward operation, a rewind operation, a fast-forward playback operation, a skip operation, or a skip rewind operation is performed, by multiplying a difference between a starting time of one of the fast-forward operation, the rewind operation, the fast-forward playback operation, the skip operation, or the skip rewind operation and a stopping time of one of these operations with a number of playback picture blocks per time unit.

* * * * *